United States Patent

Hardin et al.

[15] 3,646,584

[45] Feb. 29, 1972

[54] COORDINATE TRANSMISSION FOR CHARACTER RECOGNITION SYSTEMS

[72] Inventors: William W. Hardin, Stewartville; Patrick J. Traglia, Rochester, both of Minn.

[73] Assignee: International Business Machines Corporation, Armonk, N.Y.

[22] Filed: Nov. 14, 1969

[21] Appl. No.: 876,937

[52] U.S. Cl. ..................340/146.3AH

[51] Int. Cl. ..................G06k 9/04

[58] Field of Search ..................340/146.3; 178/6 BW, 6.6

[56] References Cited

UNITED STATES PATENTS

| | | | |
|---|---|---|---|
| 3,295,105 | 12/1966 | Gray et al. | 340/146.3 |
| 2,518,694 | 8/1950 | Jannopoulo | 340/146.3 |
| 3,347,981 | 10/1967 | Kagan et al. | 178/6 BW |
| 3,262,098 | 7/1966 | Lebell | 340/146.3 |

OTHER PUBLICATIONS

Stockdale, N. S., Format Control Apparatus, May 1967, IBM Technical Disclosure Bulletin, Vol. 9, No. 12, pp. 1765 to 1768

*Primary Examiner*—Maynard R. Wilbur
*Assistant Examiner*—William W. Cochran
*Attorney*—Sughrue, Rothwell, Mion, Zinn & Macpeak

[57] ABSTRACT

An optical character recognition system in which position data is detected by other than addressing a document field and is tagged on to a character identifying data byte. For documents in which the position of the character conveys information and for which the selected field to be scanned does not satisfactorily identify the character position, the scanning beam is tracked and converted into a position data byte when a character is detected. The position data byte is sent along with the character data byte to a utilization means.

3 Claims, 4 Drawing Figures

INVENTORS
WILLIAM W. HARDIN
PATRICK J. TRAGLIA

BY Sughrue, Rothwell, Mion, Zinn & Macpeak
ATTORNEYS

COORDINATE TRANSMISSION FOR CHARACTER RECOGNITION SYSTEMS

BACKGROUND OF THE INVENTION

The present invention is in the field of optical character recognition systems and particularly is an improvement in existing optical character recognition systems for use in reading documents on which the position of the characters is useful information.

Two examples of character recognition systems to which the present invention is added to result in the improved optical recognition system are described respectively in the commonly assigned U.S. Patent applications of William W. Hardin and Patrick J. Traglia, filed June 2, 1969, Ser. No. 829,409, entitled Area Format Control in a Character-Recognition System, and of David L. Johnston and Paul E. Nelson, filed June 2, 1969, Ser. No. 829,397, entitled Unformatted Scanning in a Character-Recognition System. The two systems described in the above-mentioned patent applications are typical system environments and are not the only machines with which the invention can be used. The latter system is capable of defining the field on a document and scanning the field for the presence of a character. The field boundaries are generated and stored during the scan of said field. The field may vary, e.g., it may be a single character location or an entire horizontal line. An example of a system for selecting and controlling the scanning of a horizontal line field is described in the Johnston and Nelson patent application described above.

In some documents the position of a character as well as the character itself may convey information. A shoe order card, for example, may have the format of style numbers listed vertically in the margin and size numbers listed horizontally at the top with the number *n* at any *x-y* position on the card indicating an order of *n* shoes of style *y* and size *x*. Consequently, for such systems it is necessary that the position of the recognized character be detected and associated with the character.

In the prior art recognition systems, the position of the field was known and this would correspond to the position of the detected character provided the system used a field size which is substantially the same as the character size, i.e., the *x* and *y* field scan controlling bytes would represent the *x* and *y* position of the currently detected character. The documents per minute which a system of the above-mentioned type is capable of reading is dependent upon the number of fields per document. This is one reason for favoring fields which cover an entire horizontal line rather than a single character space. However, for horizontal line field scanning, the *y* coordinate of the field represents the *y* coordinates of any character in the field, but the *x* coordinates of the field span an entire line and convey no information about the *x* or horizontal position of a character within the field.

SUMMARY OF THE INVENTION

In accordance with the present invention an optical character recognition system scans documents utilizing field scans which cover a horizontal line of characters and/or no characters. The horizontal position of the scanning beam is tracked during the scan and upon detection of a valid character (which may include positive identification of no character), the horizontal position is digitized and stored. The digital byte representing the detected character is transferred to the CPU channel and the stored horizontal position byte is sent along with the character identification byte.

DETAILED DESCRIPTION OF THE DRAWINGS

Figure 1:
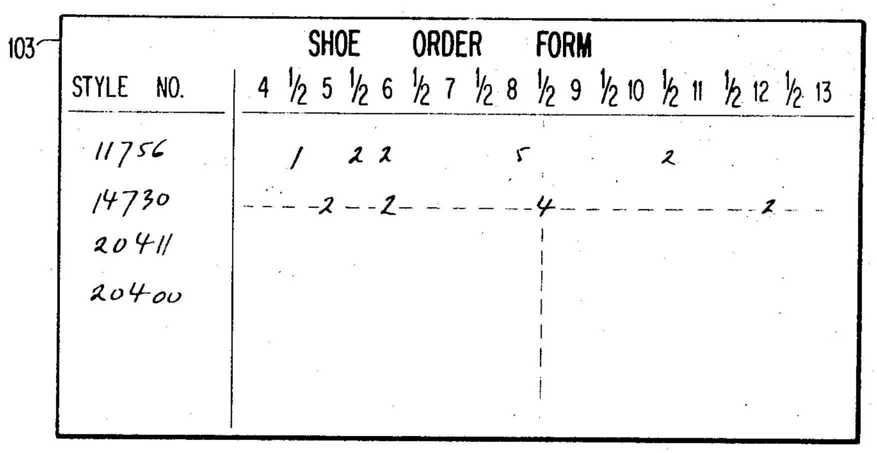
FIG. 1 illustrates a document of the type which the present invention is designed to read.

The shoe order form 103 shown in FIG. 1 illustrates a typical document of the type in which positional information is as important as the identification of a character. In the sample, different shoe style numbers written along the left-hand column and the shoe size numbers are printed horizontally across the top of the order form. A number at any *x-y* location on the form indicates the number of shoes of style *y* and size *x* to be ordered. For example, the number or character 4 indicates that 4 pairs of style 14730 at size 8½ are to be ordered.

As described above in the section on Background of the Invention, optical character recognition systems are known in which the scanner, which is preferably an optical beam plus means for deflecting the beam in the *x* and *y* direction along the document, scans an addressed field looking for characters. The address of the field is represented by *x* and *y* coordinate information designating the *x* and *y* coordinates of the field boundaries. Thus, when the field takes in an entire horizontal line of characters, the *y* position, or vertical position of any detected character may be obtained by simply extracting the *y* address of the field. However, the *x* or horizontal position of the character is not known.

Figure 2:
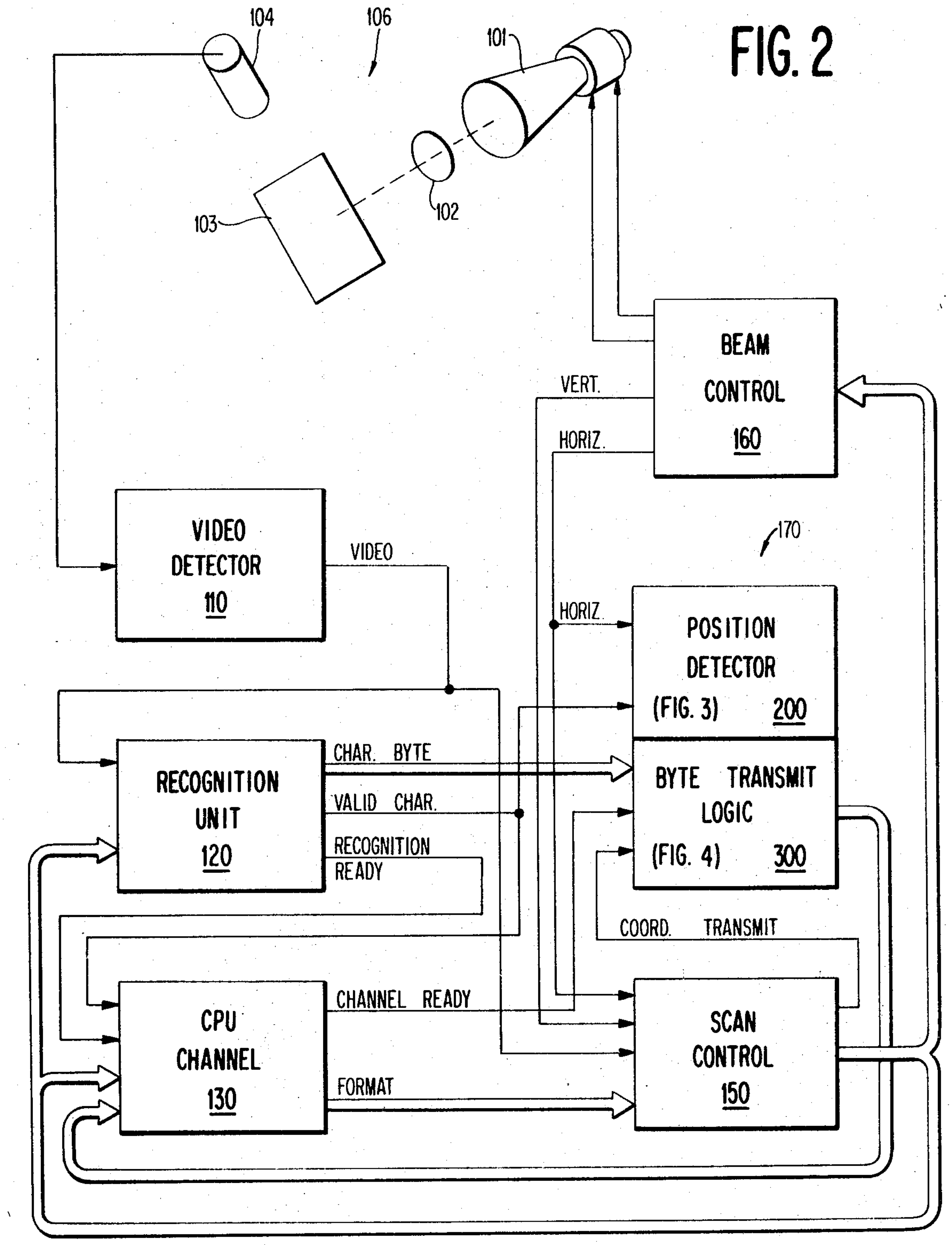
FIG. 2 is a block diagram of a prior art character recognition system plus additional hardware in accordance with the present invention.

The apparatus, which when added to the prior art optical character recognition system, operates to detect and encode the horizontal position of the character, is shown in FIG. 2 along with the prior art recognition system. The added hardware of FIG. 2 includes the position detector 200 and the byte transmit logic 300. The prior art system, shown generally in FIG. 2, includes a CPU channel 130, a scan control apparatus 150, beam control means 160, scanning mechanism 101, lens 102, optical detector 104, video detector 110, and a recognition unit 120. The CPU channel 130 transmits a format code to the scan control means 150 which, in turn, transmits control information in accordance with the format to the beam control mechanism 160. The beam control mechanism 160 controls the scanning of the beam across the document 103. The vertical and horizontal signals from the beam control means 160, representing respectively the vertical and horizontal position of the beam, are connected to the scan control means 150. The optical beam generated by means 101 reflects from the document 103 and is detected by optical detector 104 and applied to a video detector 110 which provides output indications representing character intercepts whenever the beam intercepts a character on the document. The character intercepts are applied to the recognition unit 120 which determines the identity of a character and generates a valid character indication as well as a character identifying data byte.

In accordance with the present invention, the format control signal from the CPU channel 130 includes a code indicating that the positional data of the characters should be detected and transmitted back to the CPU channel. This code may be any convenient code which does not interfere with other codes in the CPU channel. The code is detected by a conventional decode means in the scan control circuit 150 which provides an output signal representing coordinate transmit. The latter signal is applied to the byte transmit logic 300. The position detector 200 follows the horizontal position of the beam and encodes that position into a position data byte in response to a valid character identification from the recognition unit. Both the character byte and the position byte are connected to the byte transmit logic 300 which operates in response to a channel ready signal from the CPU channel and a coordinate transmit signal from the scan control circuit 150 to transmit the character byte and position byte to the CPU channel. The channel ready signal merely indicates that the CPU channel is ready to receive the information.

Figure 3:
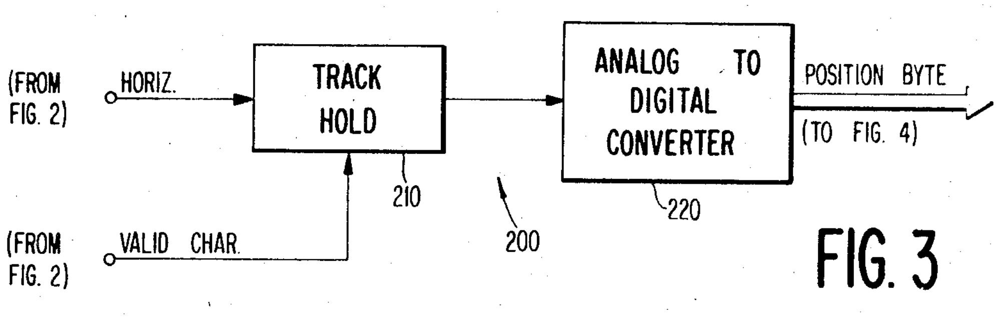
FIG. 3 is a block diagram of the position detector shown in FIG. 2.

The position detector 200 of FIG. 2 is shown in FIG. 3 and includes a conventional trackhold circuit 210 and an analog to digital converter 220. The inputs to the trackhold circuit 210 are the voltage from beam control circuit 160 representing the horizontal position of the beam and the valid character signal from the recognition unit 120. As is well known, the trackhold circuit 210 operates to follow the horizontal beam position and store the instantaneous horizontal beam position in response to receipt of a valid character signal. The stored electrical quantity, such as voltage or current, representing the horizontal position of the detected valid character is converted into a digital data byte representing horizontal position by the analog to digital converter 220.

Figure 4:
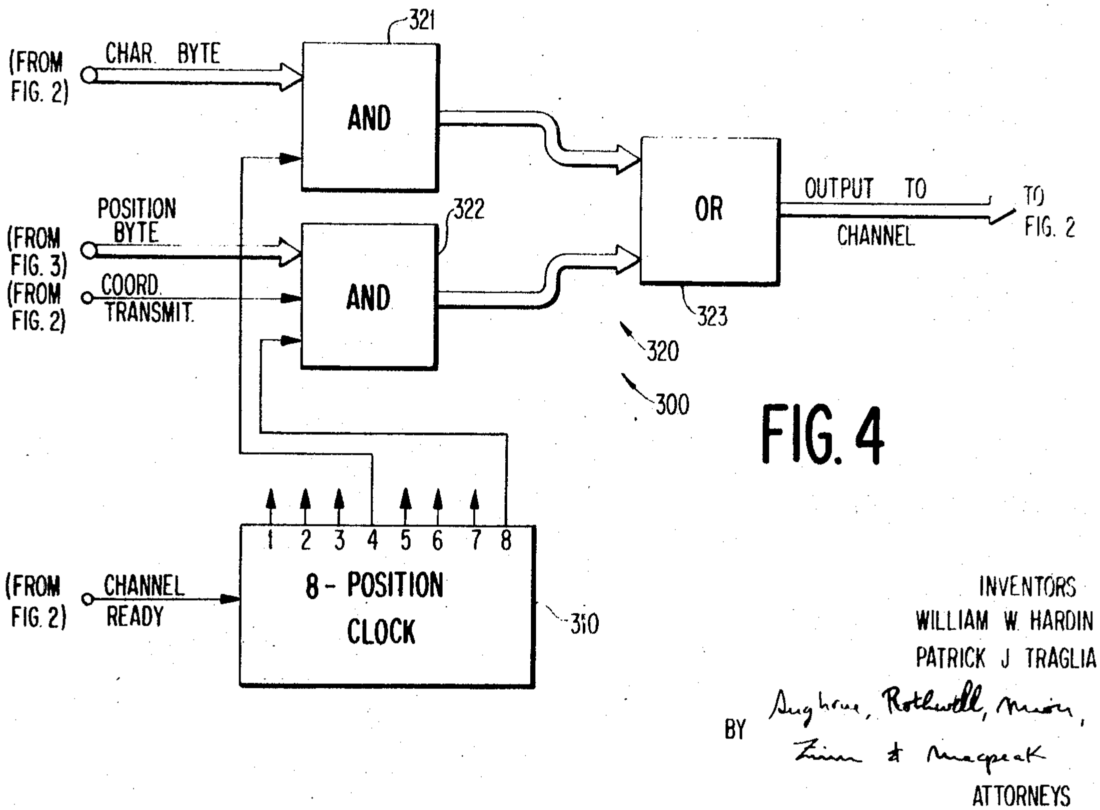
FIG. 4 is a block diagram of the byte transmit logic of FIG. 2.

The byte transmit logic 300 of FIG. 2 is shown in detail in FIG. 4 and comprises AND circuits 321 and 322, and OR circuit 323. An 8-position clock 310 may be the clock means which is part of the prior art system, but may also be a separate clock means. The character byte from recognition unit 120 of FIG. 2 is applied to AND circuit 321 and the position byte from the analog to digital converter 220 of FIG. 3 is applied to the AND circuit 322. When a channel ready signal is received from the CPU channel 130, it starts the 8-position clock circuit 310. The output pulses corresponding to the times 4 and 8, respectively, gate through AND circuits 321 and 322 the character byte and position byte. The latter bytes are also gated through OR circuit 323 and sent via a data bus to the CPU channel. The AND circuit 322 also requires a coordinate transmit signal from the scan control circuit 150 in order to transmit the position byte along with the character byte.

What is claimed is:

1. In a character recognition system of the type which scans a document, detects character intercepts, operates on the character intercepts to generate a data byte identifying a scanned character and transmits said data byte via a data bus to a utility means external of said recognition and scan control circuitry, the improvement comprising:

means responsive to an indication that a character is recognized for encoding a coordinate position of said scan into a position data byte, said encoding means comprising beam follower means for deriving an analog electrical quantity representative of position of said scan on said document along a single axis, means responsive to the recognition of a character by said character recognition system for storing the instantaneous value of said analog electrical quantity, and analog to digital converter means for converting said instantaneous value into a digital data byte, and means for transmitting said position data byte along with said recognized character data byte to said utility means, said means for transmitting comprising, clock means for providing timing pulses, means responsive to one of said timing pulses for applying said generated character data byte to said data bus, and means responsive to a different one of said timing pulses for applying said generated position data byte to said data bus.

2. A character recognition system as claimed in claim 1 wherein said beam follower means and said means for storing are parts of a track and hold amplifier circuit.

3. A character recognition system of the type having a control means for generating format control signals and for receiving data bytes representing recognized characters, a scanning beam control means responsive to format control signals for executing a beam scan on a document to be read, recognition means for detecting beam intercepts of characters on said document and for generating an indication of character detection and a character data byte representing the detected character, the improvement comprising:

a. track and hold means connected to said scanning means and responsive to character detection indication for storing an analog electrical quantity representing the instantaneous single axis position of beam on said document,
b. analog to digital converter means for converting said stored analog electrical quantity into a position data byte,
c. clock means for generating a plurality of timing pulses,
d. gating means responsive to one of said timing pulses and connected to said recognition means for transmitting said character data byte to said control means, and
e. gating means, responsive to a different one of said timing pulses and an indication from said control means indicating that position data is to be transmitted, and connected to said analog to digital converter, for transmitting said position data byte to said control means.

* * * * *